(12) United States Patent
Berezhnyy (10) Patent No.: US 9,200,957 B2
(45) Date of Patent: Dec. 1, 2015

(54) ULTRAVIOLET RADIATION SENSOR AND SENSOR MOUNT

(71) Applicant: AMO Development, LLC, Santa Ana, CA (US)

(72) Inventor: Ihor V Berezhnyy, Santa Clara, CA (US)

(73) Assignee: AMO Development, LLC, Santa Ana, CA (US)

( * ) Notice: Subject to any disclaimer, the term of this patent is extended or adjusted under 35 U.S.C. 154(b) by 93 days.

(21) Appl. No.: 13/958,260

(22) Filed: Aug. 2, 2013

(65) Prior Publication Data

US 2014/0158892 A1   Jun. 12, 2014

Related U.S. Application Data

(60) Provisional application No. 61/679,513, filed on Aug. 3, 2012.

(51) Int. Cl.
*G01T 1/20*   (2006.01)
*G01J 1/58*   (2006.01)
*G01J 1/04*   (2006.01)
*G01J 1/42*   (2006.01)

(52) U.S. Cl.
CPC ............... *G01J 1/58* (2013.01); *G01J 1/0403* (2013.01); *G01J 1/0414* (2013.01); *G01J 1/429* (2013.01)

(58) Field of Classification Search
CPC ......... G01J 1/58; G01J 1/0403; G01J 1/0414; G01J 1/429
USPC .......................................................... 250/368
See application file for complete search history.

(56) References Cited

U.S. PATENT DOCUMENTS 5,753,918 A * 5/1998 Pandelisev .................... 250/368
6,335,529 B1 * 1/2002 Sekii et al. .................... 250/372

* cited by examiner

*Primary Examiner* — David Porta
*Assistant Examiner* — Edwin Gunberg
(74) *Attorney, Agent, or Firm* — Abbott Medical Optics Inc.

(57) ABSTRACT

A sensor for measuring ultraviolet radiation and mount for retaining the sensor includes a converter plate having a perimeter and an edge about the perimeter, a retainer comprising a conical mirror and a frame having a UV blocker, and a fluorescent radiation detector coupled to the frame. The converter plate fluoresces in response to UV radiation incident on the converter plate. The conical mirror couples with the converter plate and directs a portion of the fluorescent radiation emitted from the edge of the plate to the detector coupled to the frame. The detector detects the fluorescent radiation from the converter plate and produces an electrical signal proportional to the magnitude of fluorescent radiation.

18 Claims, 7 Drawing Sheets

Aluminum ring will act as a mirror

FIG. 4

The ring will direct fluorescent light from the converter edge to detector

FIG. 11

# ULTRAVIOLET RADIATION SENSOR AND SENSOR MOUNT

CROSS-REFERENCES TO RELATED APPLICATIONS

This application claims priority to U.S. Application No. 61/679,513, filed on Aug. 3, 2012, the contents of which are incorporated herein by reference for all purposes.

FIELD OF THE INVENTION

The field of the present invention is generally related to radiation sensors and, more particularly, to ultraviolet radiation sensors and mounts for holding ultraviolet radiation sensors.

BACKGROUND

Ultraviolet (UV) light sensors, or UV sensors, have been used to measure UV energy output by a corresponding UV light source, such as an excimer laser operating in the UV wavelength range. Using a UV sensor, the excimer laser can be calibrated to a desired energy output. UV sensors typically include a plate of material that converts the UV radiation incident on the plate to visible fluorescent radiation emitting from the plate. Photodiodes or other photocells can be located near the plate to receive the fluorescent radiation and produce an electrical signal proportional to the amount of fluorescent radiation collected by the photocell(s).

Due to the nature of fluorescent light emitted from the plate, the fluorescent light tends to propagate in all directions. Conventional UV sensors are typically constructed such that the photocell is enclosed in a housing with the plate to exclude stray light from the external environment in an attempt to improve the UV sensing performance. Typically, a small fraction of the fluorescent light emitted from the plate is detected by the photocell, while the remainder of the fluorescent light is lost. For example, more than half of the fluorescent light escapes the plate through the edge of the plate due to the total internal reflection phenomenon associated with the plate. Some conventional sensor holders are designed to retain the plate by the entire plate edge, thus blocking the fluorescent light from being detected by the detector. This portion of the fluorescent light emitted from the plate edge is not available for detection. In this context, many conventional UV sensors are inefficient and characterized by reduced sensitivity and reduced resolution.

U.S. Pat. No. 7,554,093 discloses a UV sensor using multiple converter plates in an effort to generate more fluorescent light in response to UV radiation detection and multiple detectors to increase the area of fluorescent light detection. By using multiple converter plates, this approach is complex, bulky, and expensive.

Accordingly, it is desirable to provide a UV sensor with increased sensitivity and resolution by utilizing more fluorescent light while minimizing complexity, package bulk, and component cost. It is also desirable to provide a UV sensor mount that increases the amount of detectable fluorescent light. Additionally, other desirable features and characteristics of the present invention will become apparent from the subsequent detailed description and the appended claims, taken in conjunction with the accompanying drawings and the foregoing technical field and background.

SUMMARY OF THE INVENTION

The present invention is directed towards systems and apparatus for sensing and measuring ultraviolet radiation with increasing sensitivity and resolution while minimizing system complexity, bulk and cost. In one embodiment, a sensor is provided for measuring ultraviolet (UV) radiation, the sensor includes a converter plate having a perimeter and an edge about the perimeter, a retainer comprising a conical mirror and a frame, and a detector coupled to the frame. The converter plate is configured to fluoresce in response to the UV radiation incident on the converter plate. The conical mirror is configured to couple with the converter plate about the perimeter. The frame includes a blocker configured to absorb UV radiation propagating through the converter plate. The conical mirror is further configured to direct a portion of the fluorescent light emitted from the edge of the converter plate to the detector. The detector is configured to detect the fluorescent light from the converter plate and produce an electrical signal proportional to the magnitude of the fluorescent light.

In another embodiment, an ultraviolet (UV) radiation sensor retainer is provided including a central support configured to receive a UV blocker thereon, an annular support configured to receive an annular mirror, and three or more legs. Each of the legs couples the central support with the annular support, and each of the legs includes a detent configured to couple with the annular mirror while coupling with a converter.

In another embodiment, an ultraviolet (UV) radiation sensor is provided including a front housing having an aperture, a converter having an edge and configured to fluoresce in response to UV radiation incident on the converter through the aperture, an annular mirror comprising an internal reflective surface, a blocker configured to absorb UV radiation propagating through the converter, a mount configured to receive the blocker and couple with the converter and the annular mirror, a back housing retainer, a filter, a sensor configured to measure fluorescent radiation, and a back housing end plate. The internal reflective surface of the annular mirror is configured to reflect fluorescent radiation emitted from the edge of the converter to the sensor, the filter configured to inhibit propagation of ambient light to the sensor.

BRIEF DESCRIPTION OF THE DRAWINGS

In the drawings, wherein like reference numerals refer to similar components.

DETAILED DESCRIPTION

The present invention provides sensors for detecting and measuring ultraviolet (UV) radiation and mounting apparatus for UV sensors. The systems and apparatus for sensing and measuring ultraviolet radiation in accordance with the various embodiments of the present invention increase sensitivity and resolution while minimizing system complexity, bulk and cost.

In one embodiment, a sensor is provided for measuring ultraviolet (UV) radiation, the sensor includes a converter plate having a perimeter and an edge about the perimeter, a retainer comprising a conical mirror and a frame, and a detector coupled to the frame. The converter plate is configured to fluoresce in response to the UV radiation incident on the converter plate. The conical mirror is configured to couple with the converter plate about the perimeter. The frame includes a blocker configured to absorb UV radiation propagating through the converter plate. The conical mirror is further configured to direct a portion of the fluorescent light emitted from the edge of the converter plate to the detector. The detector is configured to detect the fluorescent light from the converter plate and produce an electrical signal proportional to the fluorescence.

In another embodiment, an ultraviolet (UV) radiation sensor retainer is provided including a central support configured to receive a UV blocker thereon, an annular support configure to receive an annular mirror, and three or more legs. Each of the legs couples the central support with the annular support, and each of the legs includes a detent configured to couple with the annular mirror while coupling with a converter.

In another embodiment, an ultraviolet (UV) radiation sensor is provided including a front housing having an aperture, a converter having an edge and configured to fluoresce in response to UV radiation incident on the converter through the aperture, an annular mirror comprising an internal reflective surface, a blocker configured to absorb UV radiation propagating through the converter, a mount configured to receive the blocker and couple with the converter and the annular mirror, a back housing retainer, a filter, a sensor configured to measure fluorescent radiation, and a back housing end plate. The internal reflective surface of the annular mirror is configured to reflect fluorescent radiation emitted from the edge of the converter to the sensor, the filter configured to inhibit propagation of ambient light to the sensor.

Figure 1:
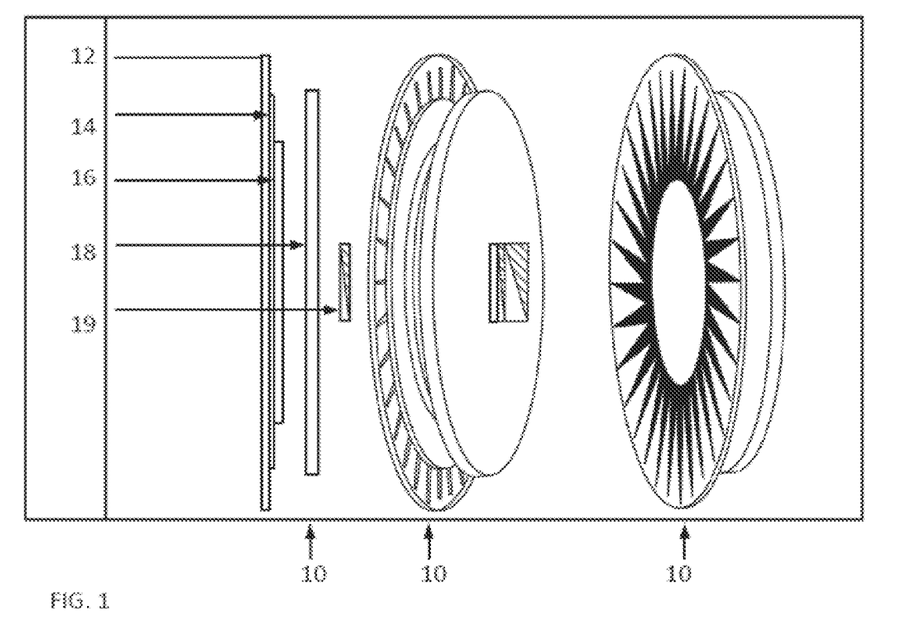
FIG. 1 is an illustration of an ultraviolet radiation sensor comparing several views of the sensor.

Referring to the drawings, a UV radiation sensor 10 is shown in FIG. 1 comparing a side view, a first perspective view, and a second perspective view from left to right. As shown in FIG. 1, the sensor 10 includes, but is not necessarily limited to, a front plate 12 having an aperture 13, a converter 14, a UV blocker 16, a filter 18, and a detector 19. The UV sensor 10 is typically packaged within a housing (not shown in FIG. 1, but see FIG. 5, for example) to minimize the interference of environmental or ambient light with the UV radiation detection, and the converter 14 is typically held in place via a retainer ring (not shown in FIG., but see FIG. 5, for example). Additionally, a processor or computing device is normally coupled with the detector 19 to measure UV radiation. In a preferred embodiment, the components of the sensor 10 are co-axially aligned, as shown in FIG. 1, for simplification of UV radiation detection, although other embodiments may be possible where one or more components of the sensor 10 are not co-axially aligned.

Figure 2:
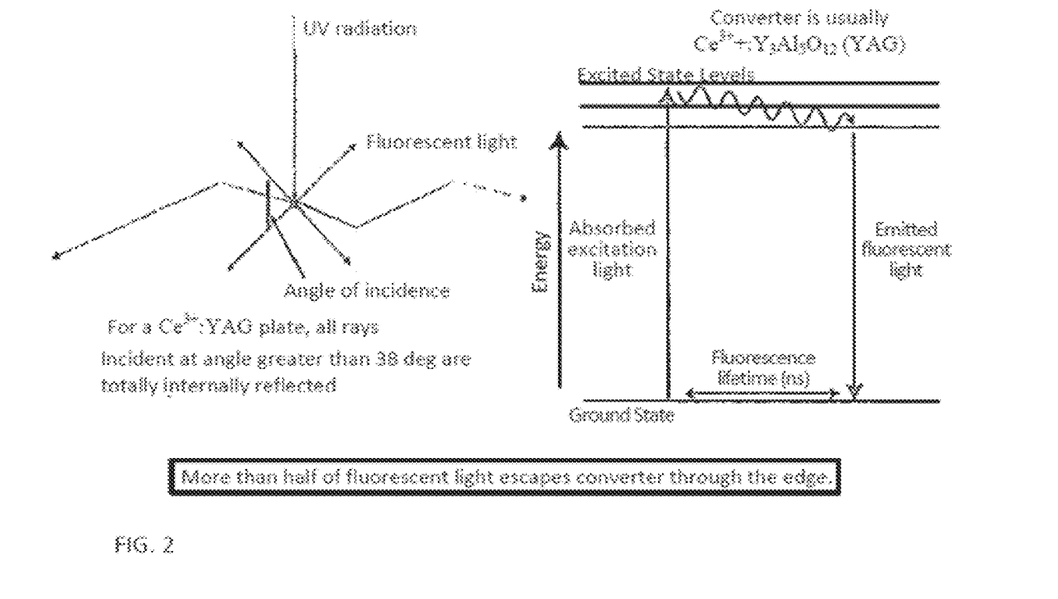
FIG. 2 is an illustration of a total internal reflection phenomenon (left) and a conversion of ultraviolet radiation to fluorescent radiation (right)

The converter 14 includes a crystal having a fluorescing response to UV radiation, such as disclosed in U.S. Pat. No. 7,554,093, the entire disclosure of which is incorporated herein. FIG. 2 is an illustration of a conversion of UV radiation to fluorescent radiation for a Cerium (III) doped Yttrium-Aluminum-Garnet ($Ce^{3+}$:YAG) crystal converter plate, such as may be used with the converter 14. As UV radiation is incident on the $Ce^{3+}$:YAG converter plate, the absorbed energy from the UV radiation generates fluorescent radiation due to the excitation of the molecules to a higher quantum state and subsequent relaxation to ground state. In general, the converter 14 linearly converts the intensity of the incident UV radiation into fluorescent radiation. The fluorescent radiation emitted from the $Ce^{3+}$:YAG converter plate tends to propagate in various directions. The fluorescent radiation emitted from the $Ce^{3+}$:YAG converter plate at an angle incident to the surface of the plate greater than about 38 degrees are typically internally reflected.

A portion of the UV radiation incident on the converter 14 passes through the converter 14 and becomes absorbed by the UV blocker 16 to prevent UV radiation from damaging the detector 19. The detector 19 may be a conventional photodetector, such as a silicon photodiode or other photocell, that is electrically connected to a meter (not shown) or the like to display and/or record the power or energy of the detected fluorescent radiation. As shown in FIG. 1, the detector 19 is centrally or axially located with respect to the filter 18. When the converter 14 is coupled with the retainer ring, the retainer ring surrounds the converter 14 in a close-fit configuration and typically blocks any fluorescent radiation that might be emitted from the edge of the plate. A consequence of this is that a small fraction of the fluorescent light emitted from this plate (i.e., from the front or back surface of the plate) is detected by the detector 19.

Figure 3:
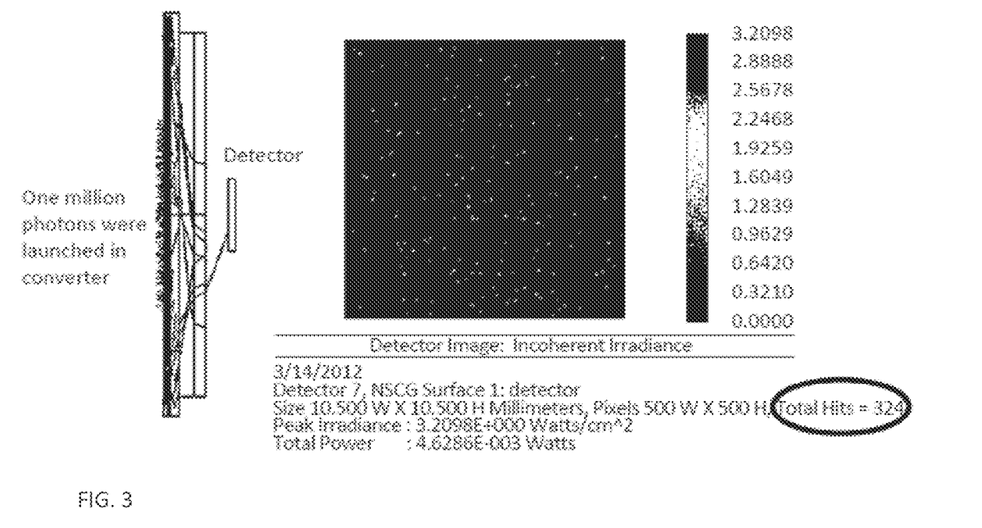
FIG. 3 is an illustration depicting the ultraviolet radiation sensor shown in FIG. 1 with fluorescent radiation emitted from the same (left) and a detector display of the emitted fluorescent radiation (right)

FIG. 3 is an illustration of fluorescent radiation emitted from the UV sensor shown 10 in FIG. 1. Based on about one-million (1,000,000) photons emitted from the converter 14, about three-hundred and twenty-four (324) emitted photons were incident on the detector 19.

Figure 4:
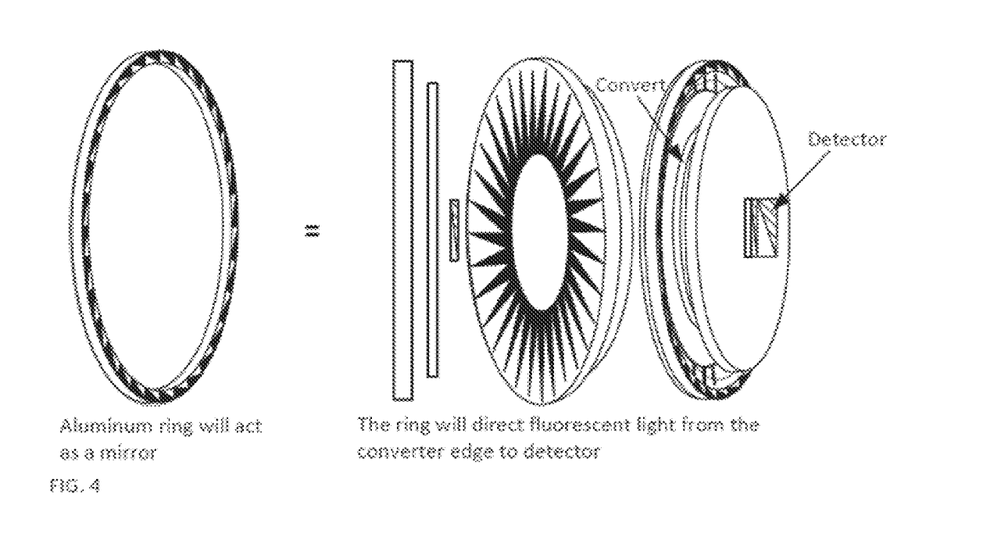
FIG. 4 is an illustration of an ultraviolet radiation sensor in accordance with one embodiment of the present invention comparing several different views.

FIG. 4 is an illustration showing a standalone annular mirror 20 (left) and a UV radiation sensor 22 incorporating the mirror 20 (right) in accordance with one embodiment of the present invention. In this embodiment, the UV sensor 22 includes the mirror 20, for example an aluminum ring, that when coupled with a converter 14 and a detector 19, is operable to direct fluorescent radiation emitted from the edge of the converter 14 to the detector 19. For example, the annular mirror is sized to encircle the periphery of the converter edge and includes an internal reflective surface oriented to direct fluorescent radiation emitted from the edge of the converter to the detector.

Figure 5:
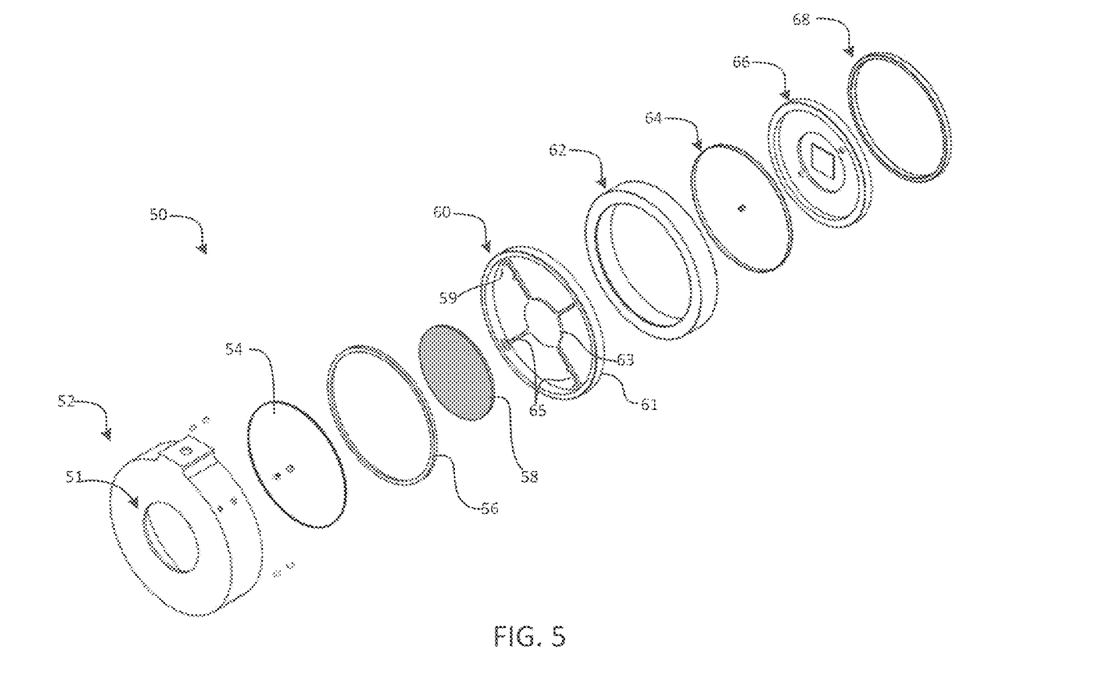
FIG. 5 is an exploded view of an ultraviolet radiation sensor in accordance with one embodiment of the present invention.

FIG. 5 is an exploded view of a UV radiation sensor 50 in accordance with one embodiment of the present invention. In this embodiment, the UV sensor 50 includes a front housing 52, a converter 54, an annular mirror 56, a UV blocker 58, a mount 60, a back housing retainer 62, a filter 64, a fluorescent radiation detector 66, and a back housing end plate 68. The terms "front" and "back" are used for convenience of explaining the relative location of the aforementioned sensor 50 components to one another and with respect to the entire assembled sensor 50 and are not intended to limit the scope of the invention. For example, the front housing 52 allows UV radiation (such as originating from a UV laser or other UV radiation source) to strike the converter 54 through an aperture 51.

The converter 54 is constructed of a fluorescent material such as rare earth doped glasses (e.g., borosilicate glass doped with any of the rare earth materials including Ce, Nd, Eu, La, etc.), fluorescent mediums suspended in plastic (e.g., rare earth doped crystal, rare earth doped glass or undoped crystal pulverized and suspended in a plastic), undoped crystals, and rare earth doped crystals (e.g., $Ce^{3+}$:YAG), or the like. In one embodiment, the converter 54 is a plate having a high index of refraction to result in a high percentage of the emitted fluorescent radiation being trapped by total internal reflection and escaping to the edge of the plate.

The annular mirror 56 is sized to encircle the edge of the converter 54 at the periphery of the plate. In a preferred embodiment, the annular mirror 56 has an internal reflective surface that is oriented to direct fluorescent radiation emitted from the edge of the converter towards the detector 66, namely towards the back of the sensor 50. For example, the annular mirror 56 may include a conical internal reflective surface that when coupled with the converter 54 directs fluorescent radiation emitted from the converter edge to the detector 66. The annular mirror 56 may have other internal surface configurations, such as a curved surface (e.g., sphere or ellipsoid curvature or the like), to direct the fluorescent radiation emitted from the converter edge.

The mount 60 provides a support for receiving the UV blocker 58 and the annular mirror 56. In one embodiment, the mount 60 is configured to receive the UV blocker 58 and couple with the converter 54 and the annular mirror 56. In this embodiment, the mount 60 includes a peripheral ring 61 and a central support element 63 coupled to the peripheral ring via three or more legs 65. The central support element 63 provides a backing for coupling the UV blocker 58 thereto. Each of the legs 65 includes a protruding detent 59 to couple with the annular mirror 56 and converter 54 while providing minimal points of contact therebetween. The peripheral ring 61 has a diameter sized to fit within the diameter of the front housing 52, and the annular mirror 56 has a diameter sized to fit with the peripheral ring 61.

The back housing retainer 62 includes a cylindrical wall, in one embodiment of the assembled sensor 50, having an anterior end for coupling with the mount 60 and the front housing 52 and having a posterior end for coupling with the back housing end plate 68. The filter 64 and detector 66 are received within the back housing retainer 62. For example, the filter 64 and detector 66 have a diameter sized to fit within the cylindrical wall of the retainer 62. The filter 64 is an optical filter to block stray radiation, e.g. ambient light, from becoming an input to the detector 66. The detector 66 may be a conventional photodetector, such as a silicon photodiode or other photocell, that is electrically connected to a meter (not shown) or the like to display and/or record the power or energy of the detected fluorescent radiation.

In operation, UV radiation enters the converter 54 through the aperture 51 of the front housing 52. A portion of the UV radiation incident on the converter 54 induces fluorescent radiation, and the remainder of the incident UV radiation passes through the converter 54 and becomes absorbed by the UV blocker 58. A majority of the induced fluorescent radiation propagates to the converter edge due to the effect of total internal reflection, and a small portion of this induced fluorescent radiation escapes the converter 54 through the front and back surfaces of the converter 54. The fluorescent radiation that emits from the converter edge is reflected by the annular mirror 56 toward the detector 66. An optical signal corresponding to the intensity of the fluorescent radiation detected by the detector 66 is converted by the detector 66 to an electrical signal corresponding to the magnitude of the detected fluorescent radiation. A meter or other power or energy monitoring device (not shown) may be electrically coupled to the detector 66 to receive the electrical signal (e.g., as an output voltage) and monitor the energy of the UV radiation incident on the converter 54 as a function of the fluorescent radiation detected by the detector 66.

Advantages of the sensor 50 include: a multiple of ten (10) increase in sensor resolution and sensitivity in comparison with the sensor 10 shown in FIG. 1; the few contact points on the mount 60 together with the annular mirror 56 allows fluorescent radiation trapped by total internal reflection in the converter 54 to emit via the converter edge and be collected and directed by the annular mirror 56 to the detector 66; the mount 60 and annular mirror 56 configuration increases the amount of detectable fluorescent radiation while preventing UV radiation passing through the converter 54 and ambient light from reaching the detector 66; the mount 60 is exchangeable with other mounts having different profiles that can change the sensor 50 sensitivity, resolution, detector size, and sensor footprint; and, the mount 60 is easily fabricated from inexpensive material.

Figure 6:
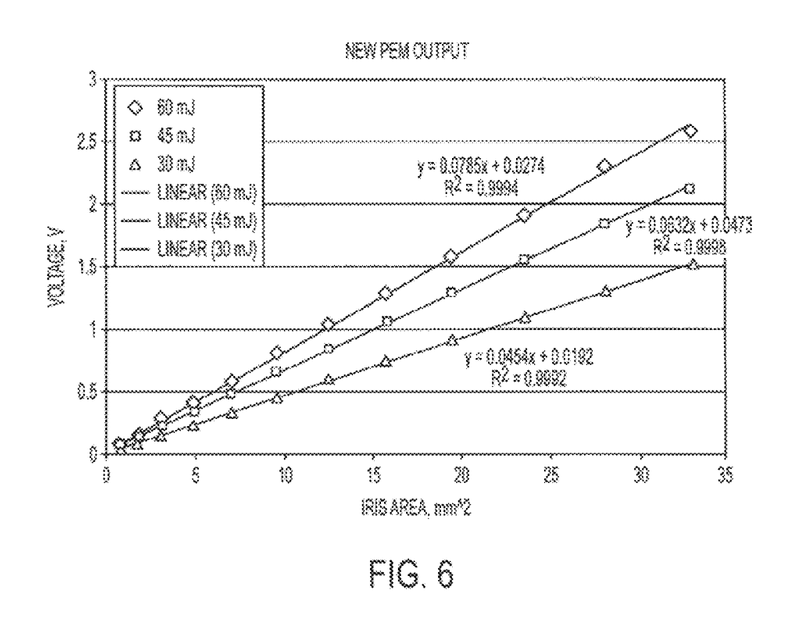
FIG. 6 is a graph comparing available detector area with output voltage for the ultraviolet radiation sensor in accordance with one embodiment of the present invention.

FIG. 6 is a graph comparing available detector area with output voltage for an ultraviolet radiation sensor in accordance with one embodiment of the present invention, such as with the sensor 50 shown in FIG. 4. This graph illustrates varying UV radiation detection sensitivity and resolution based on an area of fluorescent radiation detection for three different operating UV pulse energy magnitudes, 30 mJ, 45 mJ, and 60 mJ.

Figure 7:
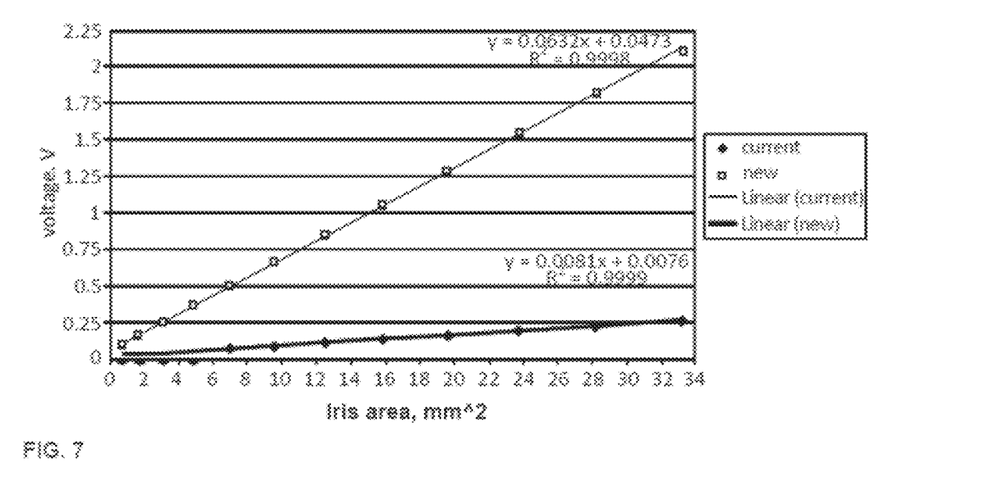
FIG. 7 is a graph comparing available detector area with output voltage for the ultraviolet radiation sensor shown in FIG. 4 and for the known ultraviolet radiation sensor shown in FIG. 1.

FIG. 7 is a graph comparing available detector area with output voltage for the UV sensor 50 shown in FIG. 4 and for the UV sensor 10 shown in FIG. 1. This graph illustrates an increased UV radiation detection sensitivity and resolution in the UV sensor 50 over the UV sensor 10 based on the area of fluorescent radiation detection at the same operating UV pulse energy magnitude.

Figure 8:
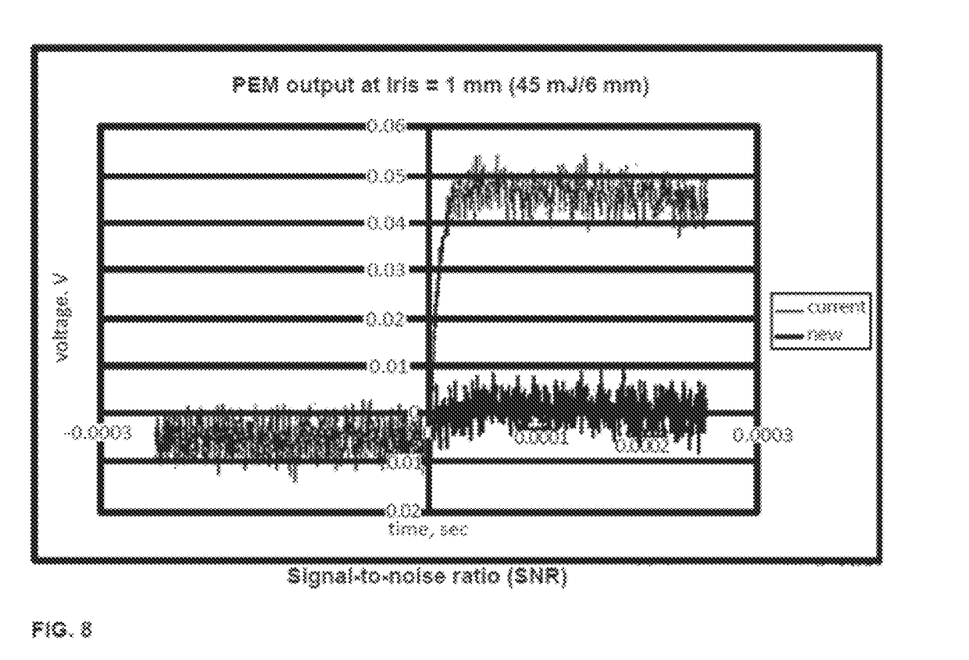
FIG. 8 is a graph of an output voltage over time for the ultraviolet radiation sensor shown in FIG. 4 and for the known ultraviolet radiation sensor shown in FIG. 1.

FIG. 8 is a graph of an output voltage over time for the UV sensor 50 shown in FIG. 4 and for the UV sensor 10 shown in FIG. 1. This graph illustrates an increased signal-to-noise ratio of the UV sensor 50 over the UV sensor 10.

Figure 9:
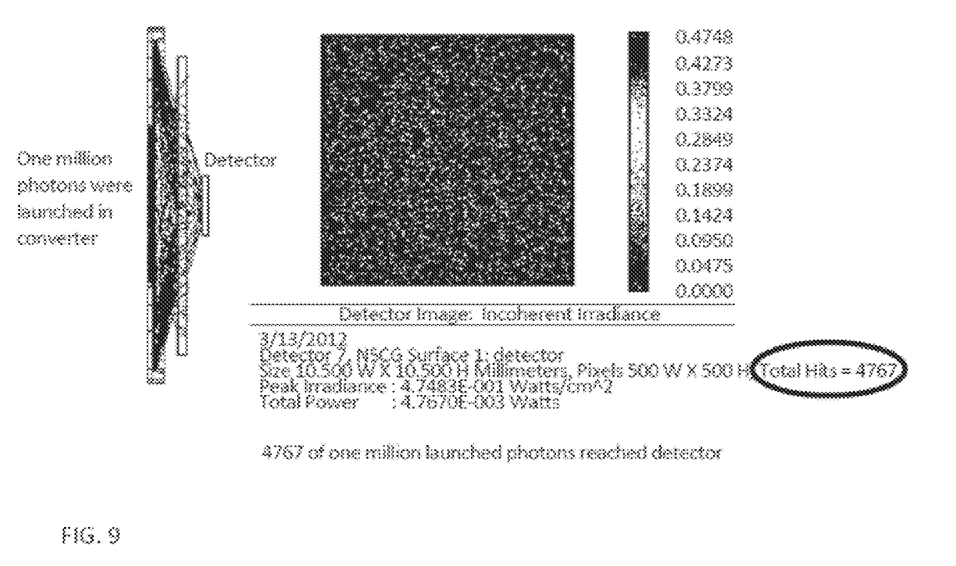
FIG. 9 is an illustration of fluorescent radiation emitted from the ultraviolet radiation sensor shown in FIG. 4.

FIG. 9 is an illustration of fluorescent radiation emitted from the ultraviolet sensor 50 shown in FIG. 4. Based on about one-million (1,000,000) photons emitted from the converter 54, about four-thousand seven-hundred and sixty-seven (4767) emitted photons were incident on the detector 66.

Figure 10:
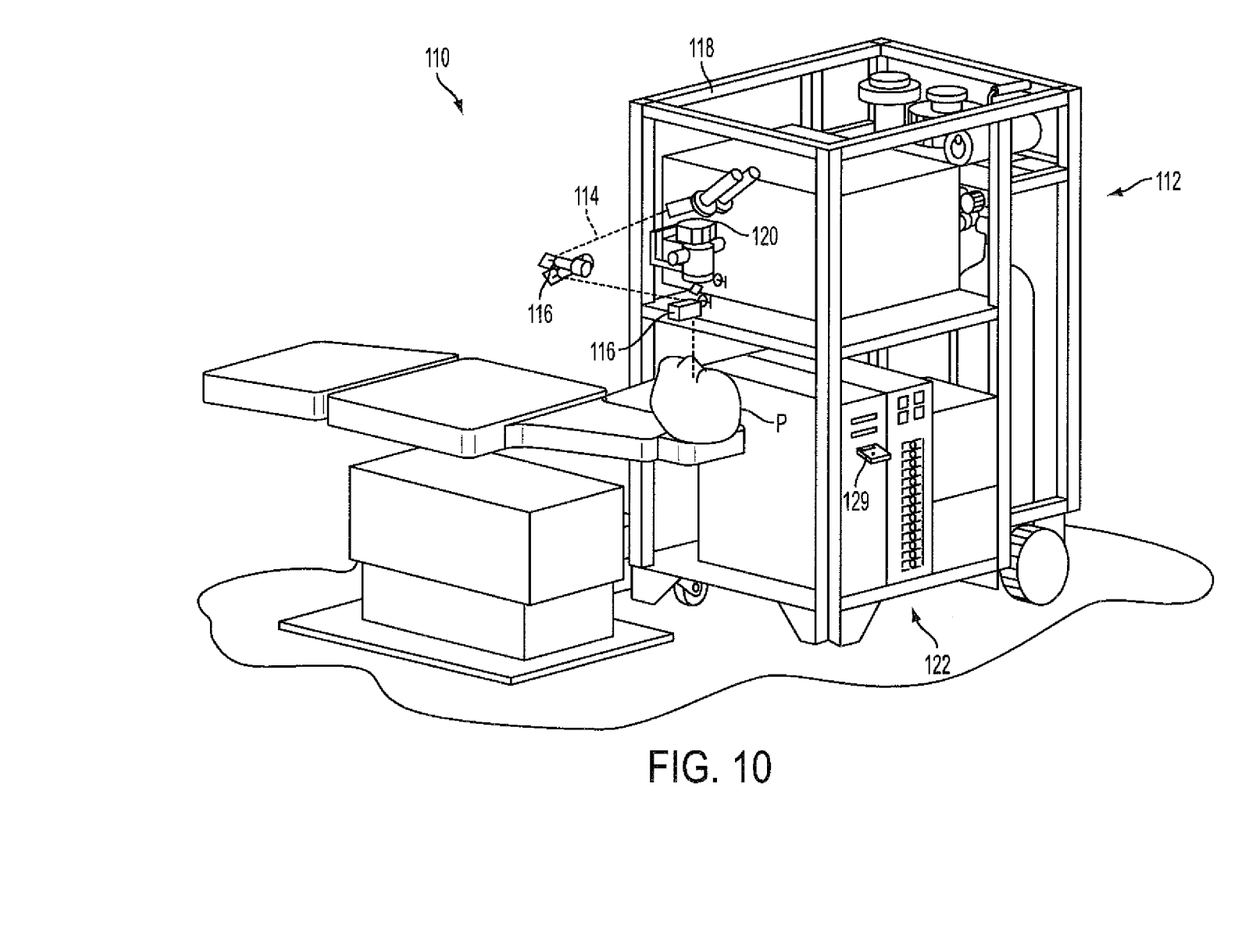
FIG. 10 illustrates a laser ablation system according to one embodiment of the present invention.

FIG. 10 illustrates a laser eye surgery system 100 for use with an ultraviolet sensor in accordance with one embodiment of the present invention, such as the sensor 50 shown in FIG. 4. The system 100 includes a laser 112 that produces a laser beam 114. The laser 112 is optically coupled to laser delivery optics 116 that directs the laser beam 114 to an eye E of a patient P. A delivery optics support structure (not shown here for clarity) extends from a frame 118 supporting the laser 112. A microscope 120 is mounted on the delivery optics support structure, the microscope often being used to image a cornea of the eye E.

The laser 112 generally includes an excimer laser, preferably including an argon-fluorine laser producing pulses of laser light having a wavelength of approximately 193 nm. The laser 112 is preferably designed to provide a feedback stabilized fluence at the patient's eye, such as by using a patient energy meter incorporating an ultraviolet sensor in accordance with one embodiment of the present invention (such as the UV sensor shown in FIG. 4 or the UV sensor 50 shown in FIG. 5), and that is delivered via the delivery optics 116. In one embodiment, the patient energy meter or UV sensor is positioned along the beam path of the laser 112. In another embodiment, the laser beam 114 is directed to the patient energy meter or UV sensor via a beamsplitter or other optical element.

The present invention may also be useful with alternative sources of ultraviolet or infrared radiation, particularly those adapted to controllably ablate the corneal tissue without causing significant damage to adjacent and/or underlying tissues of the eye. Such sources include, but are not limited to, solid state lasers and other devices which can generate energy in the ultraviolet wavelength, such as between about 185 and 355 nm and/or those which utilize frequency-multiplying techniques. Hence, although an excimer laser is the illustrative source of an ablating beam, other lasers may be used in the present invention.

The laser system 110 will generally include a computer or programmable processor 122. The processor 122 may comprise (or interface with) a conventional PC system including the standard user interface devices such as a keyboard, a display monitor, and the like. The processor 122 will typically include an input device such as a magnetic or optical disk drive, an internet connection, or the like. Such input devices will often be used to download a computer executable code from a tangible storage media 129 embodying any of the methods of the present invention. The tangible storage media 129 may take the form of a floppy disk, an optical disk, a data tape, a volatile or non-volatile memory, RAM, or the like, and the processor 122 will include the memory boards and other standard components of modern computer systems for storing and executing this code. The tangible storage media 129 may optionally embody wavefront sensor data, wavefront gradients, a wavefront elevation map, a treatment map, a corneal elevation map, and/or an ablation table. While the tangible storage media 129 will often be used directly in cooperation with an input device of the processor 122, the storage media may also be remotely operatively coupled with processor by means of network connections such as the internet, and by wireless methods such as infrared, Bluetooth, or the like.

The laser 112 and delivery optics 116 will generally direct the laser beam 114 to the eye of the patient P under the direction of a computer 122. The computer 122 will often selectively adjust the laser beam 114 to expose portions of the cornea to the pulses of laser energy so as to effect a predetermined sculpting of the cornea and alter the refractive characteristics of the eye. In many embodiments, both the laser beam 114 and laser delivery optical system 116 will be under computer control of the processor 122 to effect the desired laser sculpting process, with the processor effecting (and optionally modifying) the pattern of laser pulses. The pattern of pulses may by summarized in machine readable data of the tangible storage media 129 in the form of a treatment table, and the treatment table may be adjusted according to feedback input into the processor 122 from an automated image analysis system in response to feedback data provided from an ablation monitoring system feedback system. Optionally, the feedback may be manually entered into the processor by a system operator. Such feedback might be provided by integrating the wavefront measurement system described below with the laser treatment system 110, and the processor 122 may continue and/or terminate a sculpting treatment in response to the feedback, and may optionally also modify the planned sculpting based at least in part on the feedback.

Measurement systems are further described in U.S. Pat. No. 6,315,413, the full disclosure of which is incorporated herein by reference.

The laser beam 114 may be adjusted to produce the desired sculpting using a variety of alternative mechanisms. The laser beam 114 may be selectively limited using one or more variable apertures. An exemplary variable aperture system having a variable iris and a variable width slit is described in U.S. Pat. No. 5,713,892, the full disclosure of which is incorporated herein by reference. The laser beam may also be tailored by varying the size and offset of the laser spot from an axis of the eye, as described in U.S. Pat. Nos. 5,683,379, 6,203,539, and 6,331,177, the full disclosures of which are incorporated herein by reference.

Still further alternatives are possible, including scanning of the laser beam over the surface of the eye and controlling the number of pulses and/or dwell time at each location, as described, for example, by U.S. Pat. No. 4,665,913, the full disclosure of which is incorporated herein by reference; using masks in the optical path of the laser beam 114 which ablate to vary the profile of the beam incident on the cornea, as described in U.S. Pat. No. 5,807,379, the full disclosure of which is incorporated herein by reference; hybrid profile scanning systems in which a variable size beam (typically controlled by a variable width slit and/or variable diameter iris diaphragm) is scanned across the cornea; or the like. The computer programs and control methodology for these laser pattern tailoring techniques are well described in the patent literature.

Additional components and subsystems may be included with the laser system 110, as should be understood by those of skill in the art. For example, spatial and/or temporal integrators may be included to control the distribution of energy within the laser beam, as described in U.S. Pat. No. 5,646,791, the full disclosure of which is incorporated herein by reference. Ablation effluent evacuators/filters, aspirators, and other ancillary components of the laser surgery system are known in the art. Further details of suitable systems for performing a laser ablation procedure can be found in commonly assigned U.S. Pat. Nos. 4,665,913, 4,669,466, 4,732,148, 4,770,172, 4,773,414, 5,207,668, 5,108,388, 5,219,343, 5,646,791 and 5,163,934, the complete disclosures of which are incorporated herein by reference. Suitable systems also include commercially available refractive laser systems such as those manufactured and/or sold by Alcon, Bausch & Lomb, Nidek, WaveLight, LaserSight, Schwind, Zeiss Meditec, and the like. Basis data can be further characterized for particular lasers or operating conditions, by taking into account localized environmental variables such as temperature, humidity, airflow, and aspiration.

Figure 11:
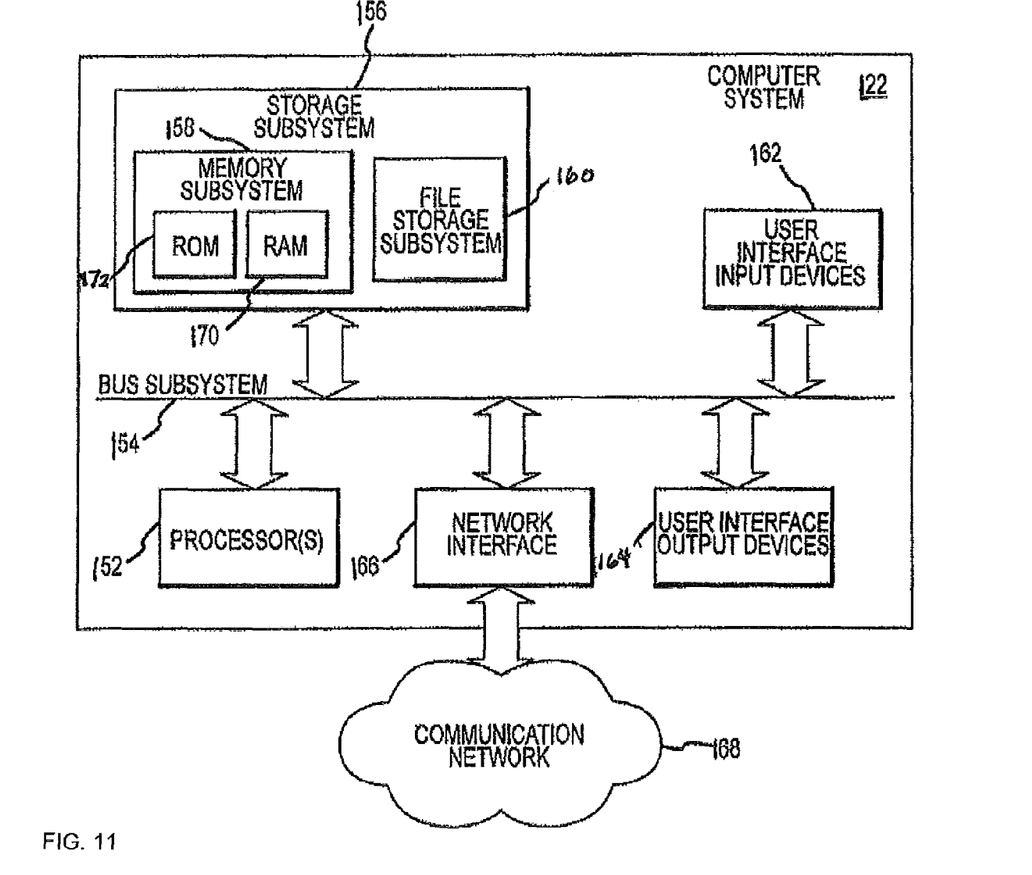
FIG. 11 illustrates a simplified computer system according to one embodiment of the present invention.

FIG. 11 is a simplified block diagram of an exemplary computer system 122 that may be used by the laser surgical system 110 of the present invention. The computer system 122 typically includes at least one processor 152 which may communicate with a number of peripheral devices via a bus subsystem 154. These peripheral devices may include a storage subsystem 156, comprising a memory subsystem 158 and a file storage subsystem 160, user interface input devices 162, user interface output devices 164, and a network interface subsystem 166. The network interface subsystem 166 provides an interface to outside networks 168 and/or other devices, such as the wavefront measurement system 130.

User interface input devices 162 may include a keyboard, pointing devices such as a mouse, trackball, touch pad, or graphics tablet, a scanner, foot pedals, a joystick, a touchscreen incorporated into the display, audio input devices such as voice recognition systems, microphones, and other types of input devices. User input devices 162 will often be used to download a computer executable code from a tangible storage media 129 embodying any of the methods of the present invention. In general, use of the term "input device" is intended to include a variety of conventional and proprietary devices and ways to input information into the computer system 122.

User interface output devices 164 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide a non-visual display such as via audio output devices. In general, use of the term "output device" is intended to include a variety of conventional and proprietary devices and ways to output information from the computer system 122 to a user.

The storage subsystem 156 can store the basic programming and data constructs that provide the functionality of the various embodiments of the present invention. For example, a database and modules implementing the functionality of the methods of the present invention, such as the detection of UV radiation as described herein, may be stored in the storage subsystem 156. These software modules are generally executed by the processor 152. In a distributed environment, the software modules may be stored on a plurality of computer systems and executed by processors of the plurality of computer systems. The storage subsystem 156 typically comprises the memory subsystem 158 and the file storage subsystem 160.

The memory subsystem 158 typically includes a number of memories including a main random access memory (RAM) 170 for storage of instructions and data during program execution and a read only memory (ROM) 172 in which fixed instructions are stored. The file storage subsystem 160 provides persistent (non-volatile) storage for program and data files, and may include the tangible storage media 129 (FIG. 10) which may optionally embody wavefront sensor data, wavefront gradients, a wavefront elevation map, a treatment map, and/or an ablation table. The file storage subsystem 160 may include a hard disk drive, a floppy disk drive along with associated removable media, a Compact Digital Read Only Memory (CD-ROM) drive, an optical drive, DVD, CD-R, CD-RW, solid-state removable memory, and/or other removable media cartridges or disks. One or more of the drives may be located at remote locations on other connected computers at other sites coupled to the computer system 122. The modules implementing the functionality of the present invention may be stored by the file storage subsystem 160.

The bus subsystem 154 provides a mechanism for letting the various components and subsystems of the computer system 122 communicate with each other as intended. The various subsystems and components of the computer system 122 need not be at the same physical location but may be distributed at various locations within a distributed network. Although the bus subsystem 154 is shown schematically as a single bus, alternate embodiments of the bus subsystem may utilize multiple busses.

The computer system 122 itself can be of varying types including a personal computer, a portable computer, a workstation, a computer terminal, a network computer, a control system in a wavefront measurement system or laser surgical system, a mainframe, or any other data processing system. Due to the ever-changing nature of computers and networks, the description of the computer system 122 depicted in FIG. 11 is intended only as a specific example for purposes of illustrating one embodiment of the present invention. Many other configurations of the computer system 122 are possible having more or less components than the computer system depicted in FIG. 11.

While embodiments of this invention have been shown and described, it will be apparent to those skilled in the art that many more modifications are possible without departing from the inventive concepts herein.

What is claimed is:

1. A sensor for measuring ultraviolet (UV) radiation, the sensor comprising:
    a converter plate having an anterior side for receiving UV radiation, a posterior side opposite the anterior side, a perimeter, and an edge about the perimeter extending between the anterior side and the posterior side, the converter plate configured to fluoresce in response to the UV radiation incident on the converter plate;
    a retainer comprising a conical mirror and a frame, the conical mirror configured to couple with the converter plate about the perimeter, the frame comprising a blocker configured to absorb UV radiation propagating through the posterior side of the converter plate; and
    a detector coupled to the frame and positioned posteriorly from the blocker, the conical mirror further configured to direct a portion of the fluorescent light emitted from the edge of the converter plate around the blocker in the posterior direction to the detector, the detector configured to detect the fluorescent light from the converter plate and produce an electrical signal proportional to the magnitude of fluorescent light.

2. An ultraviolet radiation sensor according to claim 1, wherein the conical mirror comprises a curved reflective surface.

3. An ultraviolet radiation sensor according to claim 1, wherein the conical mirror comprises a spherical curved reflective surface.

4. An ultraviolet radiation sensor according to claim 1, wherein the conical mirror comprises an ellipsoid curved reflective surface.

5. An ultraviolet (UV) radiation sensor retainer comprising:
    a central support configured to receive a UV blocker thereon;
    an annular support configured to receive an annular mirror; and
    three or more legs, the legs together coupling the central support with the annular support, each of the legs comprising a detent configured to couple with the annular mirror while coupling with a converter.

6. A UV radiation sensor retainer according to claim 5, further comprising the annular mirror having a curved reflective surface.

7. A UV radiation sensor retainer according to claim 5, further comprising the annular mirror having a spherical curved reflective surface.

8. A UV radiation sensor retainer according to claim 5, further comprising the annular mirror having an ellipsoid curved reflective surface.

9. The sensor of claim 1, wherein a thickness of the converter plate is less than a diameter of the converter plate.

10. An ultraviolet (UV) radiation sensor comprising:
    a housing having a housing aperture and housing:
        a front plate having a plate aperture;
        a converter having an anterior side for receiving UV radiation, a posterior side opposite the anterior side, and an edge extending between the anterior side and the posterior side and configured to fluoresce in response to UV radiation incident on the converter through the front plate aperture;

an annular mirror comprising an internal reflective surface;

a blocker position posteriorly from the converter and configured to absorb UV radiation propagating through the posterior side of the converter;

a mount configured to receive the blocker and couple with the converter and the annular mirror;

a retainer;

a filter;

a sensor configured to measure fluorescent radiation and positioned posteriorly from the blocker, the internal reflective surface of the annular mirror configured to reflect fluorescent radiation emitted from the edge of the converter around the blocker in the posterior direction to the sensor, the filter configured to inhibit propagation of ambient light to the sensor; and an end plate configured to couple to the housing.

11. A UV radiation sensor according to claim 10, wherein the end plate and the housing when coupled together contain the front plate, the converter, the mirror, the blocker, the mount, the retainer, the filter, and the sensor therein.

12. A UV radiation sensor according to claim 10, wherein the retainer is configured to surround the edge of the converter and block emission of fluorescent radiation from an edge of the front plate.

13. A UV radiation sensor according to claim 10, wherein the conical mirror comprises a curved reflective surface.

14. A UV radiation sensor according to claim 10, wherein the conical mirror comprises a spherical curved reflective surface.

15. A UV radiation sensor according to claim 10, wherein the conical mirror comprises an ellipsoid curved reflective surface.

16. A UV radiation sensor according to claim 10, wherein the converter comprises a fluorescent material selected from the group consisting of a rare earth doped glass, a plastic comprising a suspended fluorescent medium, an undoped crystal, and a rare earth doped crystal.

17. A UV radiation sensor according to claim 10, wherein the converter comprises a plate where a majority of the induced fluorescent radiation propagates to the edge of the converter due to the effect of total internal reflection.

18. The UV radiation sensor of claim 10, wherein a thickness of the converter plate is less than a diameter of the converter plate.

* * * * *